R. S. ARNALL.
Churn.
No. 67,095.
Patented July 23, 1867.
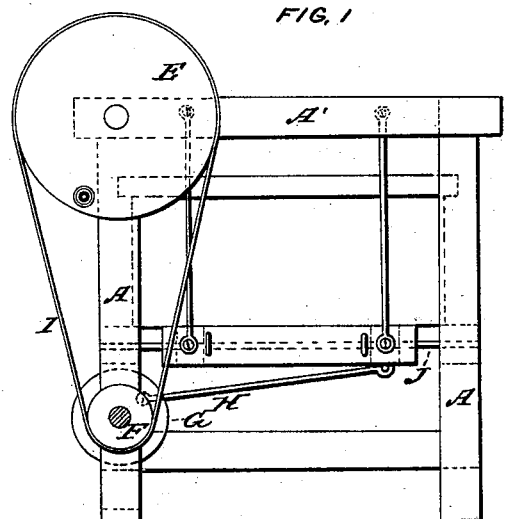
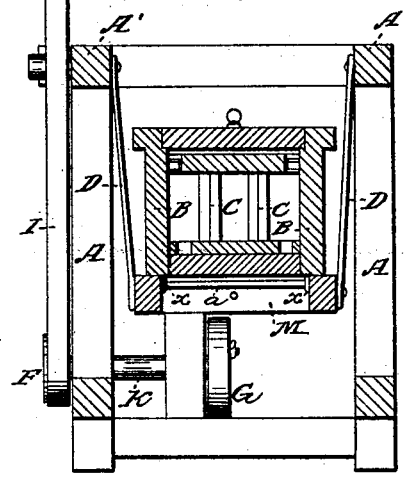
WITNESSES:
INVENTOR:

United States Patent Office.

R. S. ARNALL, OF WRIGHT CITY, MISSOURI.

Letters Patent No. 67,095, dated July 23, 1867.

IMPROVEMENT IN CHURNS.

The Schedule referred to in these Letters Patent and making part of the same.

TO ALL WHOM IT MAY CONCERN:

Be it known that I, R. S. ARNALL, of Wright City, in the county of Warren, and in the State of Missouri, have invented certain new and useful improvements in "Churns," and do hereby declare that the following is a full, clear, and exact description thereof, reference being had to the accompanying drawings, and to the letters of reference marked thereon.

In the annexed drawings, making part of this specification, A A′ represent a square frame, made of any suitable size, so that the churn-box may be hung and vibrated within it. B represents the churn-box, which is provided upon its bottom with loops $x\ x$, by means of which it is secured to a swinging frame, M. M represents a frame, which is hung by means of rods D D to the cross-pieces A′ A′ of the frame A, in such a manner that it will swing or vibrate to and fro. The churn-box B consists of a plain rectangular box, with stationary dashers C C secured within it. The frame M is secured to the cross-pieces A′ by means of four rods D at its four corners. J represents a guide-rod, which runs through the frame M, having its ends resting in the frame A. E represents a drum-wheel, secured upon a short axle projecting from the frame A, near its upper end. K represents a short axle, lying partially across the frame A, and having upon one end a drum-wheel, F, and upon the other a crank-wheel, G. A belt, I, runs from the wheel E around the wheel F. H represents a pitman, which passes from one face of wheel G to the under side of the frame M. The wheel E is provided with a handle on one face. By revolving the wheel E, the belt I communicates motion through wheel F to shaft K, and through wheel G and pitman H to frame M, thus giving a reciprocating motion to the churn-box B, which is placed and secured upon said frame M. When the churn-box is vibrated, the milk or cream within it is agitated, and, being forced against the stationary dashers and the ends of the box, its globules are broken and the butter is set free.

Having thus fully described my invention, what I claim as new, and desire to secure by Letters Patent, is—

The arrangement of the churn-box B with the vibrating frame M, connected and used with the frame A as and for the purpose set forth.

In testimony that I claim the foregoing I have hereunto set my hand and seal this 28th day of May, 1867.

R. S. ARNALL.

Witnesses:
J. T. McCOUN,
THOS. J. FORISS.